US 9,542,550 B2

(12) United States Patent
Robshaw et al.

(10) Patent No.: US 9,542,550 B2
(45) Date of Patent: Jan. 10, 2017

(54) METHOD OF MUTUAL AUTHENTICATION BETWEEN A RADIO TAG AND A READER (71) Applicant: Orange, Paris (FR)

(72) Inventors: Matthew Robshaw, Seattle, WA (US); Loïc Ferreira, Issy les Moulineaux (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/442,303

(22) PCT Filed: Nov. 12, 2013

(86) PCT No.: PCT/FR2013/052715
§ 371 (c)(1),
(2) Date: May 12, 2015

(87) PCT Pub. No.: WO2014/072667
PCT Pub. Date: May 15, 2014

(65) Prior Publication Data
US 2016/0078215 A1 Mar. 17, 2016

(30) Foreign Application Priority Data
Nov. 12, 2012 (FR) .................... 12 60737

(51) Int. Cl.
G06F 21/44 (2013.01)
H04L 9/32 (2006.01)
(Continued)

(52) U.S. Cl.
CPC ......... *G06F 21/445* (2013.01); *G06K 7/10257* (2013.01); *H04L 9/3215* (2013.01);
(Continued)

(58) Field of Classification Search
CPC .............. G06K 7/0008; G06K 19/0723; G06K 7/10366; G06K 19/07749; G06K 7/10297; G06K 2017/0045; G06K 17/00; G06K 2017/0051
(Continued)

(56) References Cited

U.S. PATENT DOCUMENTS

2011/0057779 A1* 3/2011 Canard ................ H04L 9/3236
340/10.42
2012/0200386 A1* 8/2012 Robshaw .............. H04L 9/3013
340/5.8

FOREIGN PATENT DOCUMENTS

FR 2903544 A1 1/2008

OTHER PUBLICATIONS

French Search Report and Written Opinion dated Jul. 10, 2013 for corresponding French Application No. 1260737, filed Nov. 12, 2012.
(Continued)

*Primary Examiner* — Mark Blouin
(74) *Attorney, Agent, or Firm* — David D. Brush; Westman, Champlin & Koehler, P.A.

(57) ABSTRACT

A method of mutual authentication between a radio tag and a radio reader. The method includes: authentication of the tag by the reader, implemented on a first communication channel, during which a first authentication coupon and a first authentication response are transmitted from the tag to the reader; toggling from the first communication channel to a second communication channel, different from the first channel, on which there is implemented a phase of authentication of the reader by the tag; and dispatching from the reader to the tag of a second authentication coupon and of a second authentication response which are intended to
(Continued)

authenticate the reader. The second authentication coupon is transmitted on the first communication channel.

19 Claims, 3 Drawing Sheets

(51) Int. Cl.
*H04L 29/06* (2006.01)
*G06K 7/10* (2006.01)

(52) U.S. Cl.
CPC ........ *H04L 9/3273* (2013.01); *H04L 63/0869* (2013.01); *H04L 63/18* (2013.01); *H04L 9/3218* (2013.01)

(58) Field of Classification Search
USPC ...................................... 340/10.42
See application file for complete search history.

(56) References Cited

OTHER PUBLICATIONS

Marc Girault et al: "On the Fly Authentication and Signature Schemes Based on Groups of Unknown Order", Journal of Cryptology, Springer-Verlag, NE, vol. 19, No. 4, Sep. 25, 2006 (Sep. 25, 2006), pp. 463-487, XP09440584.

McLoone M et al: "New Architectures for Low-Cost Public Key Cryptography on RFID Tags", Circuits and Systems, 2007. ISCAS 2007. IEEE International Symposium O N, IEEE, PI, May 1, 2007 (May 1, 2007), pp. 1827-1830, XP031181642.

International Search Report and Written Opinion dated Jan. 13, 2014 for corresponding International Application No. PCT/FR2013/052715, filed Nov. 12, 2013.

English translation of the Written Opinion dated May 12, 2015 for corresponding International Application No. PCT/FR2013/052715, filed Nov. 12, 2013.

* cited by examiner

Figure 4

METHOD OF MUTUAL AUTHENTICATION BETWEEN A RADIO TAG AND A READER

CROSS-REFERENCE TO RELATED APPLICATIONS

This application is a Section 371 National Stage Application of International Application No. PCT/FR2013/052715, filed Nov. 12, 2013, which is incorporated by reference in its entirety and published as WO 2014/072667 on May 15, 2014, not in English.

FIELD OF THE DISCLOSURE

The invention relates to a method of mutual authentication between a radio tag and a radio reader. More precisely, the invention relates to an authentication in the course of which the messages exchanged between a radio reader and a radio tag follow different communication channels.

BACKGROUND OF THE DISCLOSURE

It is known that in the field of contactless communications, various frequencies may be used during communications between a reader and a radio tag. Thus, for example, radio tags of "RFID" ("Radio Frequency Identification") type can communicate with an item of equipment of radio reader type according to various frequencies, for example a frequency of "HF" (for "High Frequency") type of 13.56 MHz, or a frequency of "UHF" (for "Ultra High Frequency") type in the 890 MHz range. The HF frequency is typically used in "NFC" ("Near Field Communication") applications and allows exchanges of information between entities up to a distance of about ten centimeters. NFC tags are found in contactless cards, passports, etc. The UHF frequency makes it possible to read a tag several meters distant. Generally, a tag and a reader operate and exchange messages on a given frequency. There also exist radio tags and readers which operate according to various frequencies. Thus, they can communicate according to a first frequency or according to a second frequency, depending for example on the distance which separates them.

Within the framework of authentications based on asymmetric cryptography between a reader and a passive radio tag which receives its energy from the reader when the latter is situated in proximity, it is customary to implement an authentication of the tag with the reader on a first communication channel, for example a channel of UHF type. However, authentication of the reader by the tag may thereafter turn out to be impossible, the UHF communication channel possibly not being suitable for authentication of the reader by the tag. Indeed, the authentication of the reader by the tag may require the latter to undertake cryptographic computations which are expensive in terms of energy. However, the electrical power supply provided to the passive tag by the reader via the UHF channel may turn out to be insufficient when the tag needs to perform certain computations to authenticate the reader. Thus, it is customary to implement the authentication of the reader by the tag on a second communication channel, for example the HF channel. The communication on the HF channel is established when the reader and the tag are about ten centimeters apart. The communication on the HF channel allows the reader to supply the tag sufficiently with energy so that the latter may undertake the cryptographic computations allowing it to authenticate the reader. The mutual authentication between the reader and the tag is thus done in two independent phases, via two different communication channels.

During mutual authentication, when a tag is suitable for communicating on various communication channels and when various channels are actually used for this mutual authentication, it is customary to implement a first authentication session on a first communication channel and a second authentication session on a second channel. The first session corresponds for example to the authentication of the tag by the reader and the second session to the authentication of the reader by the tag. The two sessions are independent. Each of these phases makes it necessary to exchange a certain number of messages.

SUMMARY

An exemplary embodiment of the invention proposes a method of mutual authentication between a radio tag and a radio reader, comprising the following steps, implemented by the radio tag:
- a step of dispatching to the radio reader a first authentication coupon,
- a step of receiving, from the reader, a second authentication coupon, said second coupon being received after the dispatching of the first authentication coupon,
- a step of dispatching a first authentication response, the first authentication response being computed on the basis of a first challenge, computed on the basis of the second authentication coupon,
- a step of receiving, from the reader, a second authentication response, the second authentication response being computed by the reader on the basis of a second challenge, computed on the basis of the first authentication response.

The invention also pertains to a method of mutual authentication between a reader and a radio tag, comprising the following steps, implemented by the reader:
- a step of receiving, from the tag, a first authentication coupon,
- a step of dispatching to the tag, a second authentication coupon, said second coupon being dispatched after the receipt of the first authentication coupon,
- a step of receiving, from the tag, a first authentication response, the first authentication response being computed by the tag on the basis of a first challenge, obtained on the basis of the second authentication coupon,
- a step of dispatching to the tag a second authentication response, the second authentication response being computed on the basis of a second challenge, obtained on the basis of the first authentication response.

With the method according to the invention, the number of messages exchanged between the reader and the tag in the course of this mutual authentication is less than if an authentication of the tag had been implemented by the reader followed by an authentication of the reader by the tag, according to known procedures. Indeed, such procedures customarily rely on the exchanging of a commitment, of a challenge and of a response. With the procedure described here, the first challenge which is used during the authentication of the tag by the reader is computed on the basis of the second authentication coupon dispatched by the reader to the tag and received after dispatching by the tag of a commitment, in this instance the first authentication coupon. Likewise, the second challenge, used during the authentication of the reader by the tag, is computed on the basis of the first authentication response received from the tag. The challenges are therefore no longer transmitted explicitly between the tag and the reader. The number of messages exchanged is therefore less. In the case of cryptoGPS, the number of messages exchanged goes from 6 to 4. Thus, the management of the energy, used by the two entities for the transmission of the messages, is optimized with respect to the customary case. Moreover, the security of the authentication is guaranteed since the first challenge being known to the tag only after dispatching of the first authentication coupon, it is impossible for a dishonest tag to compute the first authentication response without the knowledge of the secret key allocated to the tag. Likewise, the second challenge is known to the reader only after dispatching of the commitment, in this instance the second authentication coupon. It is therefore impossible for a dishonest reader to compute the second authentication response without the knowledge of the secret key allocated to the reader.

Advantageously, the method of mutual authentication between a radio tag and a radio reader comprises:
  a phase of authenticating the tag by the reader, implemented on a first communication channel, during which the first authentication coupon and the first authentication response are dispatched from the tag to the reader,
  a step of toggling from the first communication channel to a second communication channel, different from the first channel, on which is implemented a phase of authentication of the reader by the tag during which the second authentication coupon and the second authentication response are received from the reader, characterized in that the second authentication coupon is transmitted on the first communication channel.

When various communication channels are used in the course of a mutual authentication between two entities such as a passive radio tag and a radio reader, it is established in the field of communication over radio pathway that the first authentication, implemented on the first channel is independent of the second authentication, implemented on the second communication channel. Thus, the two authentications consist of two successive independent authentication sessions. The method of the invention proposes to intermingle the authentication sessions; it therefore runs counter to current practices. More precisely, the method proposes to transmit on the first communication channel used to implement a first authentication a datum customarily used to implement the second authentication; this datum, in this instance the second authentication coupon, is therefore customarily transmitted on the second communication channel during the second authentication. Transmitting this datum on the first communication channel, during the first authentication, makes it possible to optimize the number of messages exchanged. The method according to the invention thus makes it possible to optimize the mutual authentication protocol in terms of complexity and in terms of data transmitted between the two entities. In the case of the cryptoGPS protocol, the number of messages exchanged goes from 6 to 4. Such optimizations are considerable for tags which are very constrained in terms of memory and computation power. The authentications of the tag by the reader and of the reader by the tag are moreover always in accordance with a conventional protocol with three passes which comprises a commitment, a challenge and a response. Thus, the security of the method is always guaranteed. The authentication of the reader by the tag, implemented on the second channel is moreover faster with the method according to the invention, since a single message is dispatched from the reader to the tag. Moreover, most of the data used during this phase can be computed in the course of the first phase.

The invention draws its origin from a problem related to passive tags which receive their energy from the reader when the latter is situated in proximity. The invention is however applicable to the other tags, notably those equipped with a battery, and exhibits advantages in terms of consumption, economy of bandwidth and speed of execution.

According to an exemplary embodiment of the invention, the second authentication coupon is used by the tag to compute the first authentication response.

The first response is computed according to the invention by means of the second authentication coupon received from the reader. Thus, the second coupon plays the role of a challenge which is customarily used in a protocol with three passes comprising a commitment or first authentication coupon, a challenge and a first response. The authentication of the tag implemented by the method of mutual authentication according to the invention therefore affords the same security guarantees as the conventional mutual authentication protocol in which the two authentication sessions are independent of one another.

According to an exemplary embodiment of the invention, the first authentication response is used by the reader to compute the second authentication response.

The second authentication response provided by the reader to the tag in order to authenticate itself with the tag is computed by means of the first authentication response. Thus, the authentication of the reader, such as implemented by the method of mutual authentication according to the invention, remains in accordance with a three-pass protocol. It therefore affords the same security guarantees as the mutual authentication protocol when the authentication of the reader is implemented in the course of an authentication session independent of the tag's authentication session.

According to an exemplary embodiment of the invention, the method of the invention comprises the following steps, implemented by the tag:
  dispatching on the first communication channel of the first authentication coupon,
  reception on the first communication channel of the second authentication coupon,
  dispatching on the first communication channel of the first authentication response,
  toggling from the first communication channel to the second communication channel,
  reception on the second communication channel of the second authentication response, and
  verification that the second authentication coupon is equal to a value computed on the basis of the second authentication response.

The steps described here are those implemented by the tag. The second authentication coupon, customarily transmitted during the authentication of the reader on the second communication channel, is transmitted on the first communication channel. It thus allows the tag to compute the first authentication response, intended to be used for the authentication of the tag with the reader. Moreover, the tag uses the first authentication response that it has computed to verify the second authentication response received from the reader on the second channel.

According to this exemplary embodiment of the invention, the method comprises the following steps, implemented by the reader:
  reception on the first communication channel, of the first authentication coupon,
  dispatching on the first communication channel, of the second authentication coupon, reception on the first communication channel, of the first authentication response, verification that the first authentication coupon is equal to a value computed on the basis of the first authentication response, toggling from the first communication channel to the second communication channel, dispatching on the second communication channel of a second authentication response.

The steps described here are those implemented by the reader. The second authentication coupon is transmitted on the first communication channel. It allows the reader to verify the authentication response received from the tag, since the tag has used the second coupon to compute the first authentication response. Moreover, the reader uses the first authentication response received on the first communication channel to compute the second authentication response that it transmits on the second channel.

Advantageously, a first challenge, used by the tag to compute the first authentication response, is obtained by applying a first function to the second authentication coupon.

The first function is used by the tag to generate a challenge on the basis of a random datum, in this instance the second authentication coupon received from the reader. Thus, the challenge obtained is a random datum which is not explicitly dispatched by the reader. The method of the invention, by intermingling the tag authentication session with the reader authentication session, thus makes it possible to pool the dispatching of the second authentication coupon and of the challenge customarily dispatched in a three-pass protocol and to obtain the challenge on the basis of the second coupon.

Advantageously, the method uses a second challenge, used by the reader to compute the second authentication response, said challenge being obtained by applying a second function to the first authentication response.

In a manner comparable to what has been stated relating to the first function, the second function allows the reader to generate the second challenge on the basis of the first authentication response received from the tag on the first channel. This second challenge possesses a random character inherent to the random character of the authentication response and allows the reader to compute the second authentication response intended to be dispatched to the tag on the second channel. Thus, the method of the invention makes it possible to pool the dispatching of the first response and of the second challenge customarily dispatched explicitly in a three-pass protocol and to obtain this second challenge on the basis of the first response.

According to an exemplary embodiment of the invention, the first function is identical to the second function.

In this exemplary embodiment, the function used by the tag and the reader to generate the first challenge is the same function as that used by the reader and the tag to generate the second challenge. Thus, the tag need only store a single function. This optimization is beneficial for a tag for which the memory space of the tag may be very limited.

In an exemplary embodiment of the invention, the first communication channel is a UHF, or Ultra High Frequency, channel and the second communication channel is an HF, or High Frequency, channel.

The HF frequency is used in near-field communications. In particular, numerous NFC services, such as for example transport services use it. With such a service, a user is furnished with a card onboard which is embedded a radio tag; the user must present his card to a radio facility in order to access the transport means. It may be beneficial for such services to optimize a mutual authentication in such a way that the first authentication session, in the course of which the tag, therefore the user, authenticates himself with the reader, proceeds on the UHF channel when the latter is a certain distance from the facility. Thus, when the user is a very short distance from the facility and presents his card to the facility, the authentication of the reader by the facility on the HF channel is very fast. This may make it possible to increase the bitrate of users at the facility.

The invention also relates to a radio reader designed to authenticate itself with at least one radio tag and to authenticate the tag, and comprising:

reception means, designed to receive on a first communication channel, a first authentication coupon and a first authentication response, first dispatching means, designed to dispatch on the first communication channel, a second authentication coupon, second dispatching means, designed to dispatch on a second communication channel, different from the first channel, a second authentication response, toggling means, designed to pass from the first communication channel to the second communication channel, verification means, designed to verify that the first authentication coupon is equal to a value computed on the basis of the first authentication response.

The invention also relates to a mobile terminal comprising a radio reader according to the invention.

Such a case of use makes it possible to envisage services where the user, equipped with his mobile terminal, reads radio tags in the course of a secure protocol. Thus, the mobile terminal can be used in factory production lines, in the protection of digital contents, etc.

The invention also pertains to a radio tag suitable for authenticating a radio reader and for authenticating itself with the reader, and comprising:

dispatching means, designed to dispatch on a first communication channel a first authentication coupon and a first authentication response, first reception means, designed to receive on the first communication channel a second authentication coupon, second reception means, designed to receive on a second communication channel, different from the first channel, a second authentication response, toggling means, designed to pass from the first communication channel to the second communication channel, verification means, designed to verify that the second authentication token is equal to a value computed on the basis of the second authentication response.

The invention also relates to a radio authentication system comprising:

a radio reader according to the invention, and at least one radio tag according to the invention.

The invention also relates to a computer program intended to be installed in a memory of a radio reader, comprising instructions for the implementation of the steps of the method of mutual authentication of a radio tag and of a reader according to invention which are executed by the reader, when the program is executed by a processor.

The invention relates finally to a data medium on which the computer program according to the invention is recorded.

BRIEF DESCRIPTION OF THE DRAWINGS

Numerous details and advantages of the invention will be better understood on reading the description of a particular embodiment with reference to the appended drawings given without limitation, and in which.

DETAILED DESCRIPTION OF ILLUSTRATIVE EMBODIMENTS

The steps of a method of mutual authentication between a radio tag and a radio reader, according to an example known from the prior art, will now be described in conjunction with FIG. 1.

In this example, an authentication of the passive tag T, which receives its energy from a reader R when it is in proximity, by the reader R takes place on a first communication channel, for example the UHF channel. This authentication executes in three passes and comprises: a commitment of the tag T, a challenge of the reader R and a response of the tag T (one customarily speaks of "commitment, challenge, response"); it is followed by an authentication of the reader R by the tag T on a second communication channel, for example the HF channel. This authentication also comprises a commitment of the reader R, a challenge of the tag T and a response of the reader R. The two sessions are independent of one another and are executed successively.

The mutual authentication scheme described here is the "GPS" (or "cryptoGPS") scheme, from the name of the inventors "Girault, Paillés, Poupard, and Stern" [M. Girault, G. Poupard and J. Stern. "On the Fly Authentication and Signature Schemes Based on Groups of Unknown Order", Journal of Cryptology, pages 463-488, volume 19, number 4, 2006]. The cryptoGPS scheme is a public-key authentication technique. This is a protocol of "zero-knowledge" (or "zero disclosure of knowledge") type whose security relies on the difficulty of the discrete logarithm in a group. This scheme is customarily used so that a device which is not very powerful at all, in terms of memory or/and computation power, may authenticate itself with a second, more powerful, device.

According to this scheme, an authentication system comprises at least the passive tag T, suitable for authenticating itself with a reader R when it passes in proximity to the reader R, and for authenticating the reader R. It is assumed that the reader R and the tag T are suitable for communicating on various communication channels, each of these channels using a particular frequency band.

The scheme comprises in a conventional manner three phases: a configuration phase P10, in the course of which configuration data are provided to the tag T and to the reader R, a first authentication phase P11, in the course of which the reader R authenticates the tag T, and a second authentication phase P12, in the course of which the tag T authenticates the reader R. The configuration phase P10 can be executed only once in the life of the system. The authentication phases P11 and P12 are executed upon each mutual authentication between the tag T and the reader R. The first authentication phase P11 is implemented on a first communication channel, for example on a UHF channel whose range of frequencies lies in the vicinity of 890 MHz, as a function of local regulations, and can be executed when the reader R is situated a distance of the order of one or a few meters from the tag T. The second authentication phase P12 is implemented on a second communication channel of HF type of frequency 13.56 MHz and can be executed when the reader R is situated a distance of the order of about ten centimeters from the tag T. Indeed, for this phase, the tag T, which receives its energy from the reader R, needs to be supplied with sufficient power to be able to perform a cryptographic computation necessary for the authentication of the reader R. This power supply is insufficient when the reader R and the tag T communicate on the UHF channel.

In the course of the configuration phase P10, two pairs of cryptoGPS keys $(s_T, V_T)$ and $(s_R, V_R)$ are generated. The pairs comprise a secret key $s_T$, respectively $s_R$, and an associated public key $V_T$, respectively $V_R$. The secret key $s_T$, specific to the tag T, is stored in the tag T and is never extracted, nor transmitted outside of the tag T. The secret key $s_R$, specific to the reader R, is stored in the reader R and is never extracted, nor transmitted outside of the reader R. The public key $V_T$ associated with the secret key $s_T$ of the tag T is accessible to the reader R. The public key $V_R$ associated with the secret key $s_R$ of the reader R is accessible to the tag T in the course of the execution of the authentication protocol. The keys $s_T$ and $V_T$, respectively $s_R$ and $V_R$, are related for example according to the following formula: $V_T = -s_T P$, respectively: $V_R = -s_R P$, where P is a point, known to the reader R and to the tag T, on the elliptic curve E. In a variant, $V_T = s_T P$, respectively $V_R = s_R P$. Stated otherwise, the public key $V_T$, respectively the public key $V_R$, is computed according to the addition on the elliptic curve by adding up the point P, $s_T$ times, respectively $s_R$ times. The tag T also stores one or more authentication coupons intended to be used as commitment during the authentication of the tag T by the reader R. An authentication coupon $x_T$ can thus be pre-computed by the tag T according to the following formula: $x_T = rP$, where r is a first random item chosen by the tag T. Stated otherwise, the coupon $x_T$ is computed according to the addition on the elliptic curve, by adding up the point P, r times. The tag T stores the pre-computed coupon in association with the first random item r.

In the course of the first authentication phase P11, during which the reader R authenticates the tag T, in an initial step E11-1 of dispatching a coupon, the tag T dispatches to the reader R the coupon $x_T$ that it has stored during the configuration phase P10.

In a step E11-2 of selecting and dispatching a challenge, a challenge $c_T$ is generated by the reader R. The challenge $c_T$ is generated randomly. At the end of step E11-2, the challenge $c_T$ is dispatched by the reader R to the tag T.

In a step E11-3 of computing and dispatching a response, an authentication response $y_T$ to the challenge $c_T$ is computed by the tag T by means of the following formula: $y_T = r + s_T c_T$. The response $y_T$ is the sum of the first random item r, used to generate the authentication coupon $x_T$, and of the scalar product of the secret key $s_T$ and of the challenge $c_T$. At the end of step E11-3, the authentication response $y_T$ is dispatched to the reader R.

In a verification step E11-4, it is verified by the reader R that the authentication coupon $x_T$ received from the tag at the end of step E11-3 is equal to a value obtained by addition of a first value obtained by addition on the elliptic curve of the point P, $y_T$ times, and of a second value obtained by addition on the elliptic curve of the public key $V_T$, $c_T$ times. Stated otherwise that the coupon $x_T$ is equal to: $y_T P + c_T V_T$.

If the verification is positive (ok branch in FIG. 1), then the tag T has authenticated itself correctly with the reader R.

This first authentication allows the tag T to authenticate itself with the reader R. The exchanges performed between the tag T and the reader R take place on a first communication channel, for example the UHF channel.

In the second phase of the mutual authentication P12, comparable to the first authentication phase P11, there is undertaken the authentication of the reader R with the tag T, according to the following exchanges, comparable to the exchanges carried out previously.

However, it is not possible to perform the authentication of the reader R by the tag T on the UHF communication channel chosen to carry out the authentication of the tag T by the reader R. Indeed, the UHF channel does not allow the reader R to provide the tag T with sufficient energy for the tag to be able to perform cryptographic computations necessary for the authentication of the reader R. Thus, to implement this second authentication phase P12, it is necessary to change communication channel and to pass to a communication channel which allows the reader R to provide the tag T with sufficient energy for the tag to be able to implement the cryptographic computations necessary for the authentication of the reader R. This change of channel is possible by bringing closer together the reader R and the tag T, able to operate on various communication channels, to a distance of the order of about ten centimeters apart. After they have been brought closer together, the tag T receives sufficient energy from the reader R to respond to calls from the reader on the second channel and to ask to authenticate the reader. The reader R can then select the second channel to dialog with the tag T and authenticate itself with the tag T.

During this second phase P12, in a selection step E12-1, the reader R selects a second random item r'. In a following computation and dispatching step E12-2, the reader R computes a second authentication coupon $x_R$ according to the following formula: $x_R = r'P$. Stated otherwise, $x_R$ is computed according to the addition on the elliptic curve by adding up the point P, r' times. In another exemplary execution of the authentication protocol, the second coupon $x_R$ can be pre-computed by the reader R and stored during the configuration phase P10. However, the reader R is less constrained than the tag T in terms of computation power and can compute the second coupon during the second authentication phase P12. The second coupon $x_R$ is dispatched to the tag T by the reader R at the end of step E12-2.

In a step E12-3 of selecting and dispatching a challenge, a second challenge $c_R$ is generated by the tag T. The second challenge $c_R$ is generated randomly. At the end of step E12-3, the second challenge $c_R$ is dispatched by the tag T to the reader R.

In a computation and dispatching step E12-4, a second authentication response $y_R$ is thereafter computed by the reader R by means of the following formula: $y_R = r' + s_R c_R$. The second response $y_R$ is the sum of the random item r' and of the scalar product of the secret key $s_R$ and of the second challenge $c_R$. At the end of step E12-4, the reader R dispatches the second response $y_r$ to the tag T.

In a verification step E12-5, the tag T verifies that the second coupon $x_r$ received from the reader R at the end of step E12-2 is equal to a value obtained by addition of a first value obtained by addition on the elliptic curve of the point P, $y_R$ times, and of a second value obtained by addition on the elliptic curve of the public key $V_R$, $c_R$ times. Stated otherwise that the second coupon $x_R$ is equal to: $y_R P + c_R V_R$.

If the verification is positive (ok branch in FIG. 1), then the reader R has authenticated itself correctly with the tag T.

Thus at the conclusion of phases P11 and P12, the tag T and the reader R have mutually authenticated themselves.

The steps of a method of mutual authentication between a radio tag and a radio reader, according to a first exemplary embodiment will now be described in conjunction with FIG. 2.

The method of mutual authentication described here is based on the cryptoGPS cryptographic scheme such as described above. The tag T is a passive device which receives its energy from the reader R. The tag T and the reader R are designed to communicate, at a physical layer level, on various frequency bands, depending for example on the distance which separates them.

The example described here is based on elliptic curves; it uses a sub-group of points generated by a point P on a curve E.

According to this scheme, an authentication system comprises at least the tag T suitable for authenticating itself with the reader R when it passes in proximity to the reader R, and for authenticating the reader R.

Figure 1:
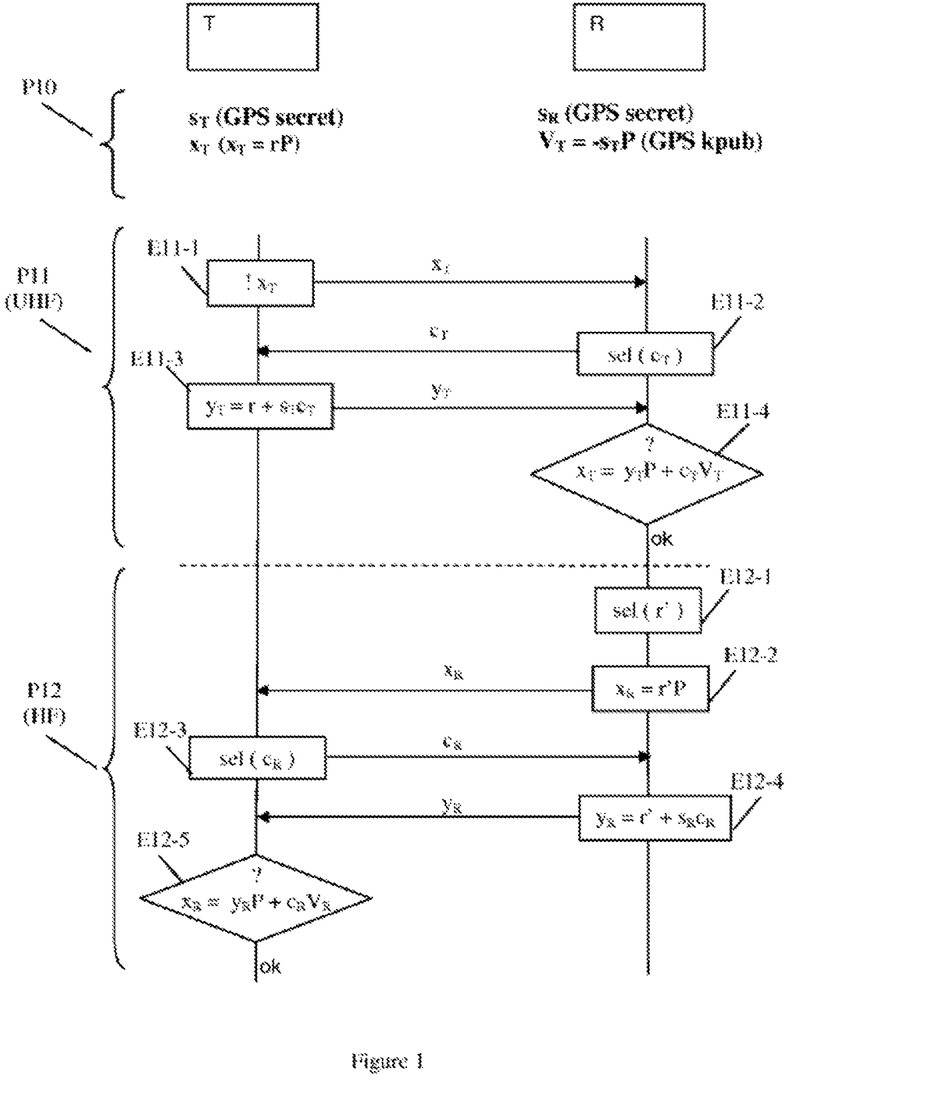
FIG. 1 presents the steps of a known scheme of mutual authentication between a tag and a reader, in this instance the cryptoGPS scheme, according to a prior state of the art.

In a manner similar to the method described in conjunction with FIG. 1, the scheme comprises three phases: a configuration phase P20, in the course of which configuration data are provided to the tag T and to the reader R, a first authentication phase P21, in the course of which the tag T authenticates itself with the reader R, and a second authentication phase P22, in the course of which the tag authenticates the reader R. The configuration phase P20 can be executed only once in the life of the system. The authentication phases P21 and P22 are executed upon each mutual authentication between the tag T and the reader R. The first authentication phase P21 is implemented on a first communication channel, for example on a UHF channel and can be executed when the reader is situated a distance of the order of one to a few meters from the tag. The second authentication phase P22 is implemented on a second communication channel, for example a channel of HF type and can be executed when the reader is situated a distance of the order of about ten centimeters from the tag. The proximity of the reader R and therefore the use of the HF channel, possible at this distance, allows the reader R to provide the tag T with sufficient energy to allow the latter to perform the expensive, in terms of computation power, cryptographic computations necessary for the authentication of the reader R.

In the course of the configuration phase P20, two pairs of cryptoGPS keys ($s_T$, $V_T$) and ($s_R$, $V_R$) are generated. The pairs comprise a secret key $s_T$, respectively $s_R$, and an associated public key $V_T$, respectively $V_R$. The secret key $s_T$, specific to the tag T, is stored in the tag T and is never extracted, nor transmitted outside of the tag T. The secret key $s_R$, specific to the reader R, is stored in the reader R and is never extracted, nor transmitted outside of the reader R. The public key $V_T$ associated with the secret key $s_T$ of the tag T is accessible to the reader R. The public key $V_R$ associated with the secret key $s_R$ of the reader R is accessible to the tag T during the authentication of the reader R. The keys $s_T$ and $V_T$, respectively $s_R$ and $V_R$, are related for example according to the following formula: $V_T = -s_T P$, respectively: $V_R = -s_R P$, where P is a point, known to the reader R and to the tag T, on the elliptic curve E. In a variant, $V_T = s_T P_T$, respectively $V_R = s_R P_R$. Stated otherwise, the public key $V_T$, respectively the public key $V_R$, is computed according to the addition on the elliptic curve by adding up the point P, $s_T$ times, respectively $s_R$ times. The tag also stores one or more authentication coupons intended to be used as commitment during the authentication of the tag T by the reader R. A first authentication coupon $x_T$ can thus be pre-computed by the tag T according to the following formula: $x_T=rP$, where r is a first random item chosen by the tag T. Stated otherwise, $x_T$ is computed according to the addition on the elliptic curve, by adding up the point P, r times. The tag T stores the pre-computed coupon in association with the first random item r.

In the course of the first authentication phase P21, during which the reader R authenticates the tag T, in an initial dispatching step E21-1, the tag dispatches to the reader R the first authentication coupon $x_T$ that it has previously stored. The first coupon $x_T$ is received and stored by the reader R in a reception step E21-2.

In a selection step E21-3, the reader R selects a second random item r'. The second random item r' can be generated by the reader R by means of a pseudo-random generator.

In a computation and dispatching step E21-4, a second authentication coupon $x_R$ is computed by the reader R according to the following formula: $x_R=r'P$. Stated otherwise, $x_R$ is computed according to the addition on the elliptic curve, by adding up the point P, r' times. In another exemplary embodiment of the authentication protocol, the second coupon $x_R$ is pre-computed and stored by the reader R during the configuration phase P20 and in this case, the selection step E21-3 and the computation performed in the course of step E21-4 are not implemented. However, the reader R is less constrained than the tag T in terms of computation power and can compute the second coupon $x_R$ during the first authentication phase P21. The second coupon $x_R$ is dispatched to the tag T at the end of step E21-4. The second coupon $x_R$ is received and stored by the tag T in a reception step E21-5.

In a following step E21-6 of generating a challenge, a first challenge $c_T$ is generated by the tag T. In this exemplary embodiment, the first challenge $c_T$ is generated by applying a function $f_1$ to the second coupon $x_R$ received from the reader R. The function $f_1$ consists for example in truncating the second coupon $x_R$ and in taking only a determined number of low-order bits. In a variant embodiment, the challenge is obtained by extracting from the coupon $x_R$ the determined number of high-order bits. It is noted that the generation, based on a random item, of the second coupon $x_R$ is random. The first challenge $c_T$ therefore preserves this random character.

In a step E21-7 of computing a response and of dispatching, the tag T computes a first authentication response $y_T$ to the first challenge $c_T$. The first authentication response is computed by means of the following formula: $y_T=r+s_T c_T$. The first authentication response $y_T$ is the sum of the random item r, stored by the tag T in association with the first coupon $x_T$, and of the scalar product of the secret key $s_T$ and of the first challenge $c_T$. At the end of step E21-7, the first authentication response $y_T$ is dispatched to the reader R. The first authentication response $y_T$ is received and stored by the reader R in a step E21-8.

In a following step E21-9 of obtaining the challenge, the reader R obtains the first challenge $c_T$ on the basis of the second authentication coupon $x_R$ that it has generated in the course of step E21-4. To this end, the reader R applies the same function $f_1$ as that applied by the tag T to the second coupon $x_R$ in the course of step E21-6. Step E21-9 of obtaining the challenge is not necessarily subsequent to the reception step E21-8. It may be implemented after step E21-4 of computing and dispatching the second authentication coupon.

In a following verification step E21-10, it is verified by the reader R that the first coupon $x_T$ received from the tag T in step E21-2 is equal to a value obtained by addition of a first value obtained by addition on the elliptic curve of the point P, $y_T$ times, and of a second value obtained by addition on the elliptic curve of the public key $V_T$, $c_T$ times. Stated otherwise that the first authentication coupon $x_T$ is equal to: $y_T P + c_T V_T$.

If the verification is negative ("nok" branch in FIG. 2), then the method stops, the authentication of the tag T having failed.

If the verification is positive ("ok" branch in FIG. 2), this signifies that the tag T has authenticated itself correctly with the reader R.

Figure 2:
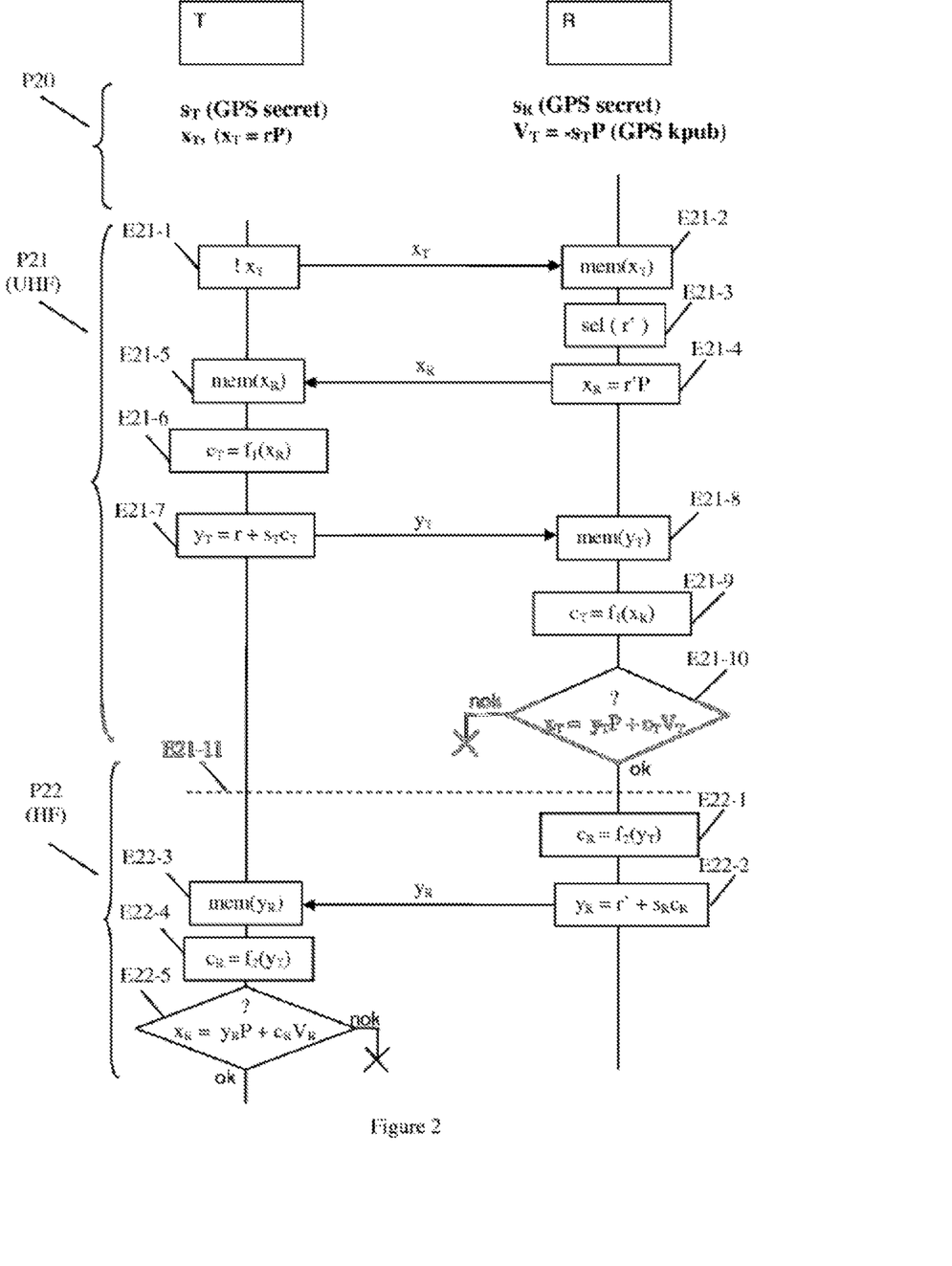
FIG. 2 presents the steps of a method of mutual authentication between a tag and a radio reader, according to a first exemplary embodiment of the invention.

In a change-of-channel step E21-11, delineated in FIG. 2 by a dashed horizontal line, there is toggling from the first channel to a second communication channel. Thus, the communication which was previously established in the UHF frequency band passes into a second frequency band, for example the HF frequency band. It is considered that this change is performed automatically when the reader R approaches the tag T until it is a distance of less than about ten centimeters away. At this distance, the tag T, suitable for communicating on several communication channels, is able to choose to pass from the first channel to the second channel. The second HF channel allows the tag T to receive more energy from the reader R which supplies it and allows it to implement the second authentication phase corresponding to the authentication of the reader by the tag. The reader R can select the second channel, on which the tag emits, to dialog with the tag and authenticate itself with it.

In a step E22-1 of generating a second challenge, the reader R generates a second challenge $c_R$ on the basis of the first authentication response $y_T$ received from the tag T in the course of the phase P21 of authenticating the tag T. The first authentication response $y_T$ possesses a random character, on account of the use for its computation of the random item r and therefore confers a random character on the second challenge $c_R$. In this exemplary embodiment, the challenge is generated by applying a second function $f_2$ to the first authentication response $y_T$. In this exemplary embodiment, the function $f_2$ is identical to the function $f_1$ used by the tag T in the course of step E21-6 of generating a challenge. It is advantageous for the tag T that the functions $f_1$ and $f_2$ be identical. Indeed, this allows the tag, which may be very constrained in terms of memory space, to store just one function. In this example, the second challenge $c_R$ is thus obtained by truncating the first authentication response $y_T$ and by extracting a determined number of low-order bits. In another exemplary embodiment of the invention, the second function $f_2$ is different from the first function $f_1$.

In a following step E22-2 of computing a second authentication response and dispatching, the reader R computes a second authentication response $y_R$ to the challenge $c_R$ by means of the following formula: $y_R=r'+s_R c_R$. The second authentication response $y_R$ is the sum of the random item r' and of the scalar product of the secret key $s_R$ and of the challenge $c_R$. At the end of step E22-2, the reader R dispatches the second response $y_R$ to the tag T. The second authentication response $y_R$ is received and stored by the tag in a step E22-3.

In a step E22-4 of obtaining the challenge, the tag T deduces the second challenge $c_R$ from the first authentication response $y_T$ that it has computed in the course of step E21-7 of computing a response. To this end, the tag T applies the same function $f_2$ as that applied by the reader R to the first coupon $x_T$ in the course of step E22-1. In this exemplary embodiment where the function $f_1$ is identical to the function $f_2$, the tag therefore applies the same function as that used to generate the first challenge $c_T$. Step E22-4 is not necessarily subsequent to the reception step E22-3. It can be implemented in parallel with the generating step E22-1 implemented by the reader R. It can also be implemented during the first authentication phase P21, after step E21-2 of generating the first authentication coupon $x_T$.

In a following verification step E22-5, the tag T undertakes the verification of the second authentication response $y_R$ received from the reader R. To this end, the tag T verifies that the second authentication coupon $x_R$ received from the reader R in the course of step E21-6 is equal to a value obtained by addition of a first value obtained by addition on the elliptic curve of the point P, $y_R$ times, and of a second value obtained by addition on the elliptic curve of the public key $V_R$, $c_R$ times. Stated otherwise that the second authentication coupon $x_R$ is equal to: $y_R P + c_R V_R$.

If the verification is positive (ok branch in FIG. 2) then the tag has positively authenticated the reader R. If the verification is negative (nok branch in FIG. 2), the method terminates without the reader R having been authenticated.

In another exemplary embodiment of the invention, steps E22-1 of generating the second challenge by the reader R and step E22-4 of obtaining the second challenge by the tag T are implemented in the course of the first authentication phase P21, when the tag T and the reader R dialog on the first communication channel. This example constitutes an optimization of the method. Indeed, the authentication of the reader R on the second channel is then faster since the challenge no longer needs to be computed on the one hand by the reader R and on the other hand by the tag T.

In the exemplary embodiment described above, the tag T and the reader R store the functions $f_1$ and $f_2$ which make it possible respectively to deduce from the first $x_T$ and second $x_R$ coupons the first $C_T$ and second challenges $c_R$. When the functions $f_1$ and $f_2$ are identical, the tag only has to store just a single function, this being an advantage when the tag is limited in terms of memory space.

It is customary to consider the two authentications, that is to say the authentication of the tag T by the reader R and the authentication of the reader R by the tag T, as two completely independent authentications, which are implemented in distinct sessions. Intermingling these two sessions in such a way that data customarily generated in the course of each of the authentications are generated in the course of the first authentication corresponding to the authentication of the tag, and that data used in the course of the authentication of the tag are used in the course of the second authentication relating to the authentication of the reader runs counter to the practice of the person skilled in the art. This authentication thus makes it possible to reduce the number of messages exchanged between the reader R and the tag T. In this instance, for the cryptoGPS authentication the number of messages exchanged goes from 6 to 4. This optimization is significant in terms of costs and complexity.

The method is described here with a version of the cryptoGPS algorithm which uses the conventional authentication coupons, that is to say of considerable size. The method is not limited to this version. Indeed, optimizations of the cryptoGPS algorithm exist; the method also applies to these optimizations. More precisely, in a first optimization of cryptoGPS it is proposed to use authentication coupons $x_i$ of the form $(x_i, r_i)$ and called "reduced coupons", with $x_i = f(r_i, P)$, where $r_i$ is a random item, P a point on the elliptic curve, and f a known one-way function, for example SHA-1 (standing for "Secure Hash Algorithm"). With this optimization, the memory space necessary for the storage of the authentication coupons on the tag is reduced.

In a second known optimization of cryptoGPS, an authentication coupon $x_i$ is indexed by an identification index i. To compute the coupon $x_i$ there is generated a random item $r_i$ by means of a pseudo-random function "PRF" (standing for "Pseudo Random Function") applied to the index i and parametrized by a regeneration key k stored by the tag ($r_i = PRF_k(i)$). The random items $r_i$ (therefore, the output of the function PRF) have a considerable size, for example 1100 bits. The tag authentication coupon $x_i$ is then computed according to the following formula: $x_i = HASH(r_i P)$. Thus, only the coupon $x_i$ needs to be stored on the tag. The random item $r_i$ is regenerated at the time of authentication by means of the function PRF. It is known that the use of the PRF requires little computation power.

Several examples of functions $f_1$ and $f_2$ for generating challenges have been described previously. A first example consists in truncating an authentication coupon, or an authentication response by extracting a predetermined number of low-order or high-order bits. The invention is of course not limited to these examples. Thus, in another exemplary embodiment, the functions $f_1$, $f_2$ can consist in extracting bits of even index or of odd index. In another exemplary embodiment, the functions $f_1$, $f_2$ can be expansion functions which on the basis of an authentication coupon or an authentication response of 1 bits generate a challenge of L bits, with $1<L$. A block cipher function can be used to this end. Finally, in another example, the function $f_1$ can consist in truncating a datum and the function $f_2$ in extending a datum. The authentication coupons, according to the version of cryptoGPS used, have a size which ranges from 64 bits, for a reduced coupon, to several hundred bits. It is customary in the various versions of cryptoGPS that the challenges have a size ranging from 32 to 64 bits. The choice of the functions $f_1$ and $f_2$ can then be guided by the sizes of these data.

The method is described here for the asymmetric cryptoGPS algorithm. The invention is not limited to this algorithm. Thus, the method applies to any authentication protocol based on asymmetric cryptography for which computations which may turn out to be expensive for one of the entities require a change of communication channel. For example, the method also applies to the RSA protocol (from the name of the inventors, "Rivest, Shamir and Adleman"), for which it is known that the computations which implement the secret key are more expensive, in terms of resources, than those which implement the public key.

Figure 3:
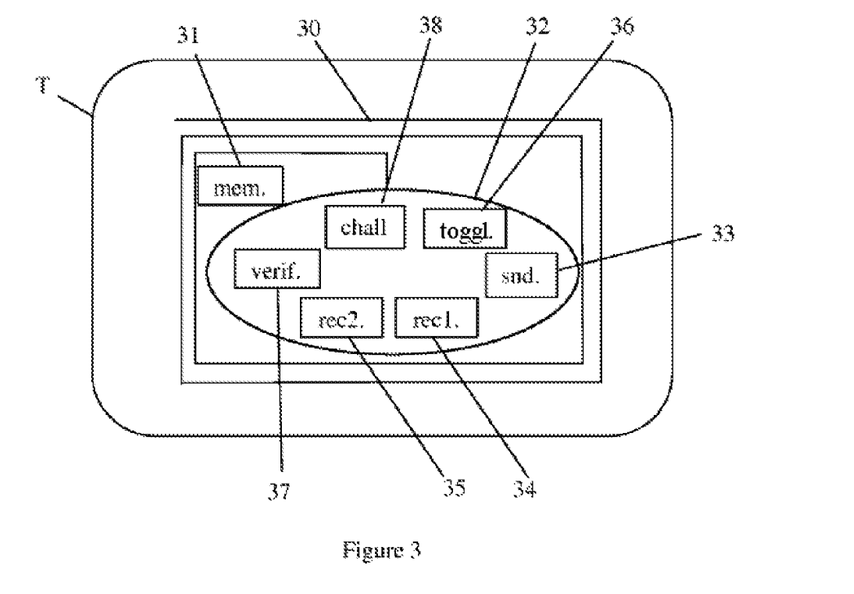
FIG. 3 represents a particular exemplary embodiment of a radio tag designed to authenticate a radio reader according to the invention and described in conjunction with FIG. 4.

A radio tag T according to a particular form of embodiment of the invention will now be described in conjunction with FIG. 3. The tag T is suitable for dialoging with a radio reader (not represented in FIG. 3) in the course of a mutual authentication sequence in accordance with the method steps described in conjunction with FIG. 2.

In the particular example described here, the tag T is a passive device receiving its energy from the radio reader during an interrogation by the latter. The tag T comprises:
  an antenna 30 suitable for dispatching data to the reader and receiving data from the reader,
  storage means 31, such as a memory, suitable for storing the secret key $s_T$ of the pair of cryptoGPS keys ($s_T$, $V_T$), the point P and at least the authentication coupon $x_T$ in association with the random item r. In a variant embodiment which relates to an optimization of the cryptoGPS cryptographic scheme, the storage means 31 are also designed to store elements specific to this optimization, for example a secret regeneration key used to regenerate random items used in the computation of reduced coupons, one or more pseudo-random functions, and the pre-computed authentication coupons, a silicon chip 32 comprising a plurality of transistors suitable for constituting logic gates of non-programmable hard-wired logic. The hard-wired logic defines:

means which, coupled to the antenna 30, constitute dispatching means 33 suitable for dispatching the first authentication coupon $x_T$ to the reader. The dispatching means 33 are also designed to dispatch the first authentication response $y_T$ computed by the tag to the reader.

first means which, coupled to the antenna 30, constitute first reception means 34, suitable for receiving from the reader on the first communication channel the second authentication coupon $x_R$, second means which, coupled to the antenna 30, constitute second reception means 35, designed to receive from the reader on the second communication channel the second authentication response $y_R$, means which, coupled to the antenna 30, constitute communication channel toggling means 36, designed to pass from a first communication channel to a second communication channel so as to communicate with the reader. The choice of one or another frequency band to communicate with the reader is performed for example according to the distance which separates the reader from the tag. For example, in the case of a passive tag, this toggling can be controlled by the tag according to the level of energy that it receives from the reader. Indeed, the closer the reader is to the tag the higher the energy provided to the tag. The tag can thus be designed to detect that an energy threshold provided by the reader is attained and toggle from a first communication channel to a second communication channel. By toggling from the first channel to the second communication channel, the tag which was dialoging with the reader on the first channel chooses to respond to calls from the reader on the second channel. Thus, when the reader is situated a distance of the order of one to a few meters from the tag, the selected frequency band is the UHF band. If the reader approaches the tag to a distance of close to about ten centimeters, then the toggling means 36 select the HF frequency band for the communication between the reader and the tag; in the case of the method according to the invention, toggling onto the second communication channel on which the tag has more energy makes it possible to initiate the authentication of the reader, verification means 37, designed to verify that the second authentication coupon $x_R$ received from the reader is equal to a value obtained by addition of a first value obtained by addition on the elliptic curve of the point P, $y_R$ times, and of a second value obtained by addition on the elliptic curve of the public key $V_R$, $C_R$ times. Stated otherwise that the second authentication coupon $x_R$ is equal to: $y_R P + c_R V_R$. Thus, the verification means make it possible to verify the authenticity of the reader, means 38 for obtaining a challenge, designed to obtain a challenge on the basis of an authentication coupon. More precisely, the means for obtaining a challenge 38 comprise a function $f_1$ and a function $f_2$. The first function $f_1$, applied to the first authentication coupon $x_T$ makes it possible to obtain a first challenge $C_T$, used by the tag to compute the first authentication response $y_T$. The second function $f_2$, applied to the first authentication response makes it possible to obtain a second challenge $c_R$, used by the tag to verify the authenticity of the reader.

The dispatching means 33 are designed to implement steps E21-1 and E21-7 of dispatching of the method of mutual authentication described above. The first reception means 34 are designed to implement step E21-5 of receiving the second coupon $x_R$. The second reception means 35 are designed to implement step E22-3 of receiving the second authentication response $y_R$. The verification means 37 are designed to implement the verification step E22-5. The means 38 for obtaining a challenge are suitable for implementing steps E22-4 and E21-6. The toggling means 36 are designed to implement the toggling step E21-11.

In a variant embodiment, the tag T is an active device which has a battery for emitting signals toward a reader situated in proximity.

Figure 4:
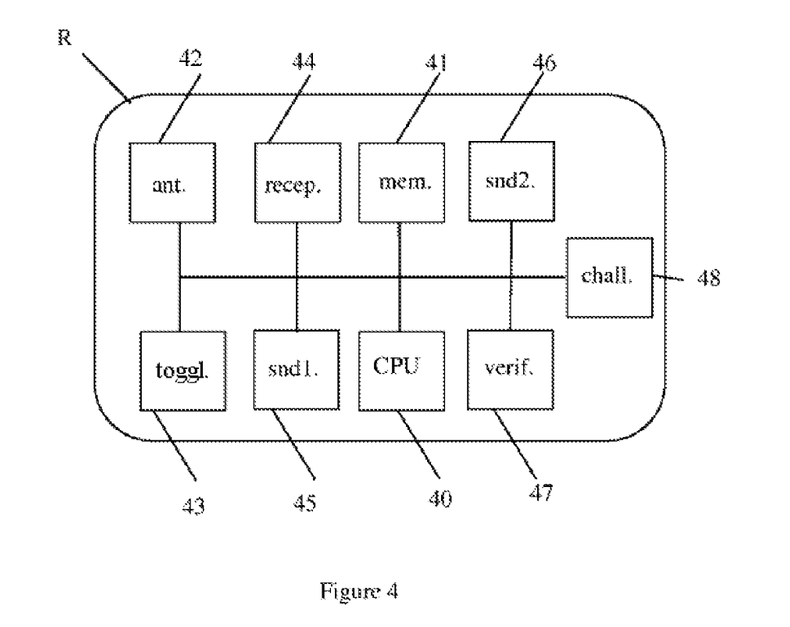
FIG. 4 represents an exemplary embodiment of a radio reader designed to authenticate itself with a radio tag described in conjunction with FIG. 3.

A radio reader R according to a particular form of embodiment of the invention will now be described in conjunction with FIG. 4.

The radio reader R is an active, radio frequency emitter device which activates a tag (not represented in FIG. 4) which passes in proximity by providing it with energy which it needs. The reader R according to the invention is suitable for dialoging with the tag in the course of an authentication sequence in accordance with the previously described steps of the method according to the invention. The reader R is suitable for emitting and receiving signals on various communication channels.

The reader R comprises several modules:

a processing unit 40, or "CPU" (standing for "Control Processing Unit"), a set of memories, including a volatile memory 41, or "RAM" (for "Random Access Memory") used to execute code instructions, store variables, etc., and a storage memory of "EEPROM" type (standing for "Electrically Erasable Programmable Read Only Memory"), designed to store the secret key $s_R$ of the pair of cryptoGPS keys ($s_R$, $V_R$), the public key $V_T$ of the tag and the point P. In a variant embodiment which relates to an optimization of the cryptoGPS cryptographic scheme, the storage means are also designed to store elements specific to this optimization, for example pre-computed authentication coupons, an antenna 42, suitable for emitting and receiving on the radio pathway, means which, coupled to the antenna 42, constitute means 43 for toggling from one communication channel to another, designed to pass from a first communication frequency to a second communication frequency, to dialog with the tag for the implementation of the authentication protocol. More precisely, the reader is designed to emit on various frequency bands. The choice of one or another frequency band to communicate with the tag T according to an authentication protocol is controlled by the tag, and is dependent for example on the distance which separates the tag from the reader. Thus, if the tag T is situated a distance of the order of a meter away, the frequency band selected is the UHF band. If the tag T approaches the reader R to a distance close to about ten centimeters, then the toggling means 43 select the HF frequency band for the communication between the tag and the reader, a reception module 44, coupled to the antenna 42, designed to receive from the tag on the first communication channel a first authentication coupon $x_T$, dependent on the first random item r. The reception module 44 is also designed to receive on the first communication channel a first authentication response $y_T$ to a first challenge. The first authentication response is thereafter used by a verification module 47 in order to verify the authenticity of the tag, first dispatching means 45, coupled to the antenna 42, designed to dispatch to the tag on the first communication channel the second authentication coupon $x_R$, dependent on a second random item chosen by the reader, second dispatching means 46, coupled to the antenna, designed to dispatch to the tag on the second communication channel a second authentication response $y_R$, computed by the reader, the verification means 47, designed to verify the authenticity of the tag T. More precisely, the verification means 47 are designed to verify that the first authentication coupon $x_T$ received from the tag T is equal to a value obtained by addition of a first value obtained by addition on the elliptic curve of the point P, $y_T$ times, and of a second value obtained by addition on the elliptic curve of the public key $V_T$, $c_T$ times. Stated otherwise that the first authentication coupon $x_T$ is equal to: $y_T P + c_T V_T$, means 48 for generating a challenge, designed to generate a first challenge $c_T$ by means of the second authentication coupon $x_R$, and to generate a second challenge $c_R$ by means of the first authentication response $y_T$.

The means communicate via a communication bus.

The means 43 for toggling from one communication channel to another are designed to implement the toggling step E21-11 described above. The reception means 44 are designed to implement steps E21-2 and E21-8 of the above-described authentication method. The first dispatching means 45 are designed to implement step E21-4 and the second dispatching means 46 are designed to implement step E22-2 described above. The verification means 47 are designed to implement step E21-10 of verifying the above-described authentication method. The means 48 for generating a challenge are designed to implement steps E21-9 and E22-1 of the authentication method.

These preferably entail software modules comprising software instructions for executing the steps of the method of mutual authentication.

The invention therefore also relates to:

a computer program comprising instructions for the implementation of the method of mutual authentication of a tag and of a reader such as described above, when this program is executed by a processor;

a recording medium readable by a reader on which the computer program described hereinabove is recorded.

The software modules may be stored in, or transmitted by a data medium. The latter may be a hardware storage medium, for example a CD-ROM, a magnetic diskette or a hard disk, or else a transmission medium such as a signal, or a telecommunication network.

In an exemplary embodiment, the reader T is integrated into a mobile terminal, thus able to dialog with radio tags.

The invention claimed is:

1. A method comprising:
mutual authentication between a radio tag and a radio reader, comprising the following acts, implemented by the radio tag:
dispatching to the radio reader a first authentication coupon,
receiving, from the reader, a second authentication coupon, said second coupon being received after the dispatching of the first authentication coupon,
dispatching a first authentication response, the first authentication response being computed on the basis of a first challenge, computed on the basis of the second authentication coupon,
receiving, from the reader, a second authentication response, the second authentication response being computed by the reader on the basis of a second challenge, computed on the basis of the first authentication response.

2. The method of mutual authentication as claimed in claim 1, comprising:
a phase of authentication of the tag by the reader, implemented on a first communication channel, during which the first authentication coupon and the first authentication response are dispatched from the tag to the reader,
toggling from the first communication channel to a second communication channel, different from the first channel, on which is implemented a phase of authentication of the reader by the tag during which the second authentication coupon and the second authentication response are received from the reader,
wherein the second authentication coupon is transmitted on the first communication channel.

3. The method as claimed in claim 2 in which the first communication channel is an Ultra High Frequency (UHF) channel and the second communication channel is a High Frequency (HF) channel.

4. The method as claimed in claim 1, comprising the following acts, implemented by the tag:
dispatching on the first communication channel of the first authentication coupon,
reception on the first communication channel of the second authentication coupon,
dispatching on the first communication channel of the first authentication response,
toggling from the first communication channel to the second communication channel,
reception on the second communication channel, of the second authentication response, and
verification that the second authentication coupon is equal to a value computed on the basis of the second authentication response.

5. The method as claimed in claim 1, in which a first challenge, used by the tag to compute the first authentication response is obtained by applying a first function to the second authentication coupon.

6. The method as claimed in claim 5, in which a second challenge, used by the reader to compute the second authentication response is obtained by applying a second function to the first authentication response and in which the first function is identical to the second function.

7. A method comprising:
mutual authentication between a reader and a radio tag, comprising the following acts, implemented by the reader:
receiving, from the tag, a first authentication coupon,
dispatching to the tag, a second authentication coupon, said second coupon being dispatched after the receipt of the first authentication coupon, receiving, from the tag, a first authentication response, the first authentication response being computed by the tag on the basis of a first challenge, obtained on the basis of the second authentication coupon, dispatching to the tag a second authentication response, the second authentication response being computed on the basis of a second challenge, obtained on the basis of the first authentication response.

8. The method as claimed in claim 7, comprising the following acts, implemented by the reader:
   reception on the first communication channel, of the first authentication coupon,
   dispatching on the first communication channel, of the second authentication coupon,
   reception on the first communication channel, of the first authentication response,
   verification that the first authentication coupon is equal to a value computed on the basis of the first authentication response,
   toggling from the first communication channel to the second communication channel,
   dispatching on the second communication channel of a second authentication response.

9. The method as claimed in claim 7, in which a second challenge, used by the reader to compute the second authentication response is obtained by applying a second function to the first authentication response.

10. The method of mutual authentication as claimed in claim 7, comprising:
   a phase of authentication of the tag by the reader, implemented on a first communication channel, during which the first authentication coupon and the first authentication response are dispatched from the tag to the reader,
   toggling from the first communication channel to a second communication channel, different from the first channel, on which is implemented a phase of authentication of the reader by the tag during which the second authentication coupon and the second authentication response are received from the reader,
   wherein the second authentication coupon is transmitted on the first communication channel.

11. The method as claimed in claim 10 in which the first communication channel is an Ultra High Frequency (UHF) channel and the second communication channel is a High Frequency (HF) channel.

12. The method as claimed in claim 7, comprising the following acts, implemented by the reader:
   reception on the first communication channel, of the first authentication coupon,
   dispatching on the first communication channel, of the second authentication coupon,
   reception on the first communication channel, of the first authentication response,
   verification that the first authentication coupon is equal to a value computed on the basis of the first authentication response,
   toggling from the first communication channel to the second communication channel,
   dispatching on the second communication channel of a second authentication response.

13. The method as claimed in claim 7, in which a first challenge, used by the tag to compute the first authentication response is obtained by applying a first function to the second authentication coupon.

14. The method as claimed in claim 7, in which a second challenge, used by the reader to compute the second authentication response is obtained by applying a second function to the first authentication response.

15. The method as claimed in claim 14, in which a second challenge, used by the reader to compute the second authentication response is obtained by applying a second function to the first authentication response and in which the first function is identical to the second function.

16. A radio reader designed to authenticate itself with at least one radio tag and to authenticate the tag, and comprising:
   reception means for receiving a first authentication coupon and a first authentication response
   first dispatching means for dispatching a second authentication coupon,
   second dispatching means for dispatching a second authentication response, the second authentication response being computed on the basis of a second challenge, obtained on the basis of the first authentication response, and
   verification means for verifying that the first authentication coupon is equal to a value computed on the basis of the first authentication response.

17. A mobile terminal comprising a radio reader as claimed in claim 16.

18. A radio tag suitable for authenticating a radio reader and for authenticating itself with the reader, and comprising:
   dispatching means for dispatching a first authentication coupon and a first authentication response, the first authentication response being computed on the basis of a first challenge, obtained on the basis of a second authentication coupon received from the reader,
   first reception means for receiving the second authentication coupon,
   second reception means for receiving a second authentication response, and
   verification means for verifying that the second authentication token is equal to a value computed on the basis of the second authentication response.

19. A non-transitory computer-readable data medium comprising a computer program stored thereon and comprising instructions for implementing a method of mutual authentication of a radio tag and of a reader which is executed by the reader, when the program is executed by a processor, the method comprising:
   receiving, from the tag, a first authentication coupon,
   dispatching to the tag, a second authentication coupon, said second coupon being dispatched after the receipt of the first authentication coupon,
   receiving, from the tag, a first authentication response, the first authentication response being computed by the tag on the basis of a first challenge, obtained on the basis of the second authentication coupon,
   dispatching to the tag a second authentication response, the second authentication response being computed on the basis of a second challenge, obtained on the basis of the first authentication response.

* * * * *